United States Patent [19]
Knight

[11] Patent Number: 5,733,406
[45] Date of Patent: Mar. 31, 1998

[54] MANUFACTURE OF VALVES FOR INFLATABLE ARTICLES

[75] Inventor: Karl Dean Knight, South San Francisco, Calif.

[73] Assignee: M & D Balloons, Inc., Manteno, Ill.

[21] Appl. No.: 537,592

[22] Filed: Oct. 2, 1995

[51] Int. Cl.$^6$ ............................................................. B32B 31/20
[52] U.S. Cl. .................... 156/359; 156/361; 156/498; 156/510; 156/513; 156/553; 156/581; 156/308.4; 446/224
[58] Field of Search .................... 156/269, 271, 156/289, 290, 292, 358, 359, 361, 390, 498, 510, 513, 523, 553, 581, 582, 308.4, 552; 242/534, 334.2; 446/224

[56] References Cited

U.S. PATENT DOCUMENTS

| | | | |
|---|---|---|---|
| 2,237,346 | 4/1941 | Gilfillan | 156/271 |
| 3,859,159 | 1/1975 | Carter et al. | 156/308.4 |
| 4,431,470 | 2/1984 | Schubert | 156/308.4 |
| 4,436,576 | 3/1984 | Seiden | 156/553 |
| 4,445,960 | 5/1984 | Niklasson | 156/308.4 |
| 4,674,532 | 6/1987 | Koyanagi . | |
| 4,708,167 | 11/1987 | Koyanagi . | |
| 4,850,912 | 7/1989 | Koyanagi . | |
| 5,188,558 | 2/1993 | Barton | 446/224 |
| 5,194,062 | 3/1993 | Membrino | 493/203 |
| 5,249,758 | 10/1993 | Müller | 242/534.2 |
| 5,295,892 | 3/1994 | Felton | 446/224 |
| 5,405,479 | 4/1995 | Anderson | 156/289 |

Primary Examiner—Michael W. Ball
Assistant Examiner—Michael A. Tolin
Attorney, Agent, or Firm—Fitch, Even, Tabin Flannery

[57] ABSTRACT

Valve making apparatus heat seals valve films together, and cools the resulting product web. Valves are preferably formed in two side-by-side serial arrays, with each operation of a valve die forming multiple balloon valves, including a portion of a balloon valve to be completed on a subsequent operation of the sealing die. A tension control and web conveyor are also disclosed.

34 Claims, 9 Drawing Sheets

Fig. 16

MANUFACTURE OF VALVES FOR INFLATABLE ARTICLES

BACKGROUND OF THE INVENTION

1. Field of the Invention

The present invention pertains to the manufacture of inflatable articles such as toy balloons, and in particular to the manufacture of so-called "self-sealing" valves used therein.

2. Description of the Related Art

Over the years, non-latex toy balloons have become increasingly popular, requiring increasingly larger production quotas to meet customer demand. An important component of typical non-latex toy balloons offered for sale today is the so-called "self-sealing" valve. Examples of "self-sealing" or "flat" valves are given in U.S. Pat. Nos. 4,674,532; 4,708,167; and 4,850,912. In addition to toy balloons, flat valves are used in inflated packages, waterbags, or similar devices typically made from plastic film. In its simplest form, the valve comprises a flattened hollow tube of readily flexible plastic film. The valve is positioned in the interior of the toy balloon, with the inlet end located in the neck of the balloon. When filling of the balloon is desired, gas pressure is introduced into the interior of the balloon, through the hollow tubular passageway of the valve. As the balloon approaches its final, inflated state, internal pressure developed within the balloon acts to compress the flat valve. This compressing pressure is easily overcome by inflating gas pressures transmitted through the valve. However, when inflating pressure is removed from the valve, internal pressure of the balloon causes the flat valve to quickly collapse, thus preventing gas within the balloon from escaping.

One manufacturer of flat valves has provided serial arrays of valves which, when rolled, provide a convenient supply roll of flat valves to manufacturers of toy balloons or other pressure-containing film articles. The valves are formed one at a time using a heat sealing die to define the lateral, outside edges of the valve. The valve film is conveniently provided by a single continuous roll of valve film folded in half along its longitudinal centerline to register two layers of valve film in preparation for the heat sealing operation. The folded edge of the valve film lies along the inlet (or outlet) ends of the valve, and must be trimmed away so that access can be gained to the interior valve passageway formed by the sealing die.

Improvements in speed and economy of manufacture are still being sought.

SUMMARY OF THE INVENTION

It is an object of the present invention to provide apparatus for manufacturing self-sealing valves.

Another object of the present invention is to provide apparatus of the above-described type with improved unwinding control.

A further object according to principles of the present invention is to provide apparatus of the above-described type having improved throughput capacity.

These and other objects of the present invention are provided in apparatus for making toy balloon valve products and other inflatable articles, comprising:

a supply of a web including overlying first and second valve films, with the web comprising first and second web portions in serial succession;

a workstation whereat valve products are made from the web;

conveyor means actuable by a conveyor control signal for conveying the web past the workstation;

sealing means at the workstation, actuable by a sealing control signal for heating the web to seal the first and the second valve films together to form valve products including at least one toy balloon valve;

cooling means at the workstation, actuable by a cooling control signal for cooling the web, including a heat exchange surface movable into and out of engagement with the valve product; and control means for sending a conveyor control signal to the conveyor means for moving the first portion of the web containing a first valve product past the sealing means and for moving the second portion of the web to the sealing means, for sending a sealing control signal to the sealing means for sealing the first and the second valve films of the second portion of the web together to form another valve product in serial succession with the first valve product and for sending a cooling control signal to the cooling means for cooling the web.

Other objects of the present invention are provided in apparatus for making toy balloon valve products, comprising:

a supply of a web including overlying first and second valve films, with the web comprising first and second web portions in serial succession;

a workstation whereat valve products are made from the web;

conveyor means actuable by a conveyor control signal for conveying the web past the workstation;

seating means at the workstation, actuable by a sealing control signal for heating the web to seal the first and the second valve films together to form a valve product comprising at least one entire balloon valve in serial succession with an incomplete portion of at least one other balloon valve; and control means for sending a conveyor control signal to the conveyor means for moving the first portion of the web containing a first valve product past the sealing means and for moving the second portion of the web to the sealing means, for sending a sealing control signal to the sealing means for sealing the first and the second valve films of the second portion of the web together to form a second valve product, including forming a complete valve with the incomplete part of the first portion.

Further objects of the present invention are provided in a web supply with multiple tension adjustments, comprising:

spool means for storing a supply of web to be unrolled;

rotational mounting means for mounting the spool means for rotation;

a brake disk attached to one of the spool means and the rotational mounting means for rotation therewith;

caliper means for frictionally engaging the brake disk;

a double ended brake arm;

a dancer roller for engaging the web, mounted at one end of the brake arm;

arm mounting means for pivotally mounting the brake arm adjacent the caliper means;

weight means mounted for movement along the brake arm; and connecting rod means mounted adjacent the other end of the brake arm, including a connecting rod coupled to the caliper means through a resiliently compressible bias means.

Other objects of the present invention are provided in a method for making a continuous series of toy balloon valves, comprising:

providing first and second valve films;

overlying one of the first and the second valve films with the other;

provide a sealing die having die portions for sealing the first and the second valve films together so as to form at least one complete valve and an incomplete part of another valve;

advancing the valve films adjacent the sealing die;

sealing the valve films of the first portion together with the sealing die;

advancing second portions of the valve films adjacent the sealing die; and sealing the second portions of the web together with the sealing die so as to form a complete valve with the incomplete part of the first portion.

DETAILED DESCRIPTION OF THE PREFERRED EMBODIMENT

Referring now to the drawings, and initially to FIGS. 1–5, a valve making machine is generally indicated at 10. The machine includes an inlet end 12 and an outlet end 14. Supply rolls 16, 18 of plastic films 32, 34, such as blended polyethylene compositions or the like, are located at the inlet end. The rolls 16, 18 are supported by a frame generally indicated at 20. Together, the films 32, 34 make up a web that is processed by machine 10 to produce a variety of valve products. A side-by-side pair of product rolls 24, 26 are also supported by frame 20 at the outlet end 14 of the machine. A workstation generally indicated at 30 is located at the middle of the machine.

Figure 1:
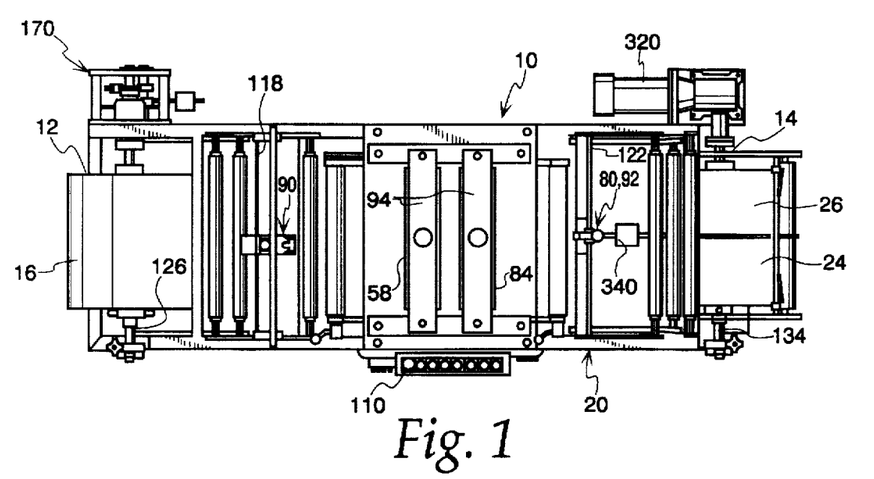
FIG. 1 is a top plan view of valve making apparatus according to principles of the present invention.
Figure 2:
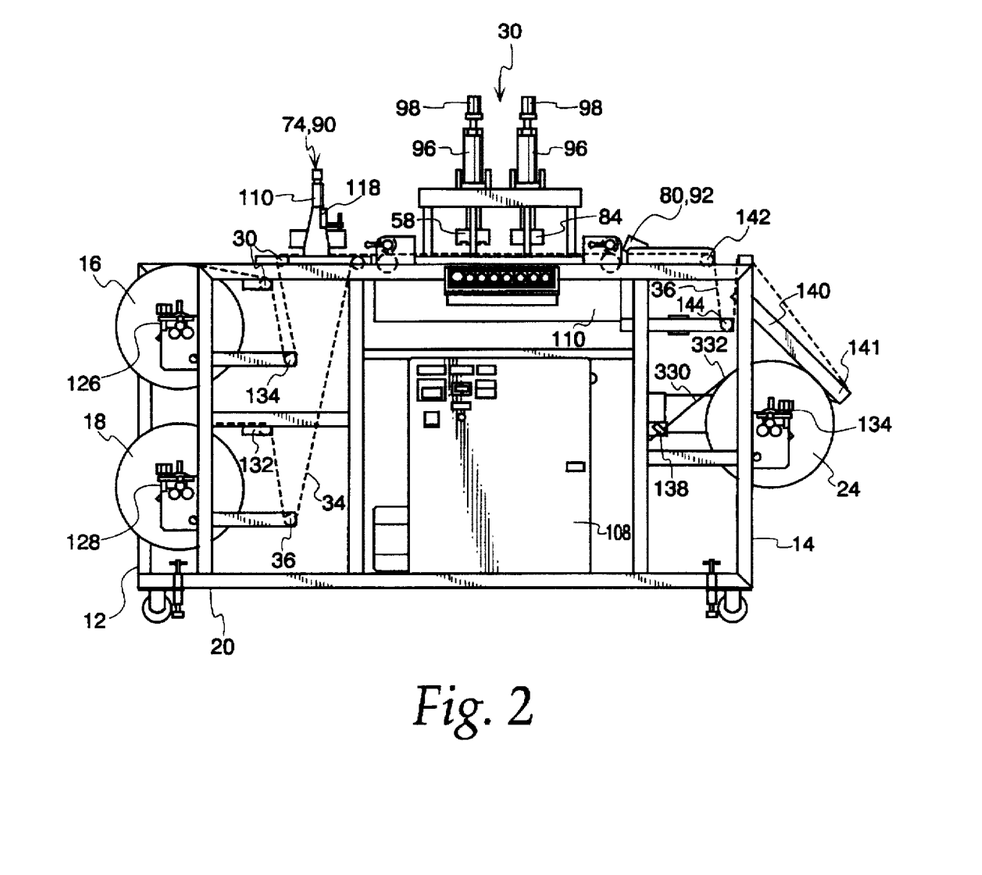
FIG. 2 is a front elevational view thereof.
Figure 3:
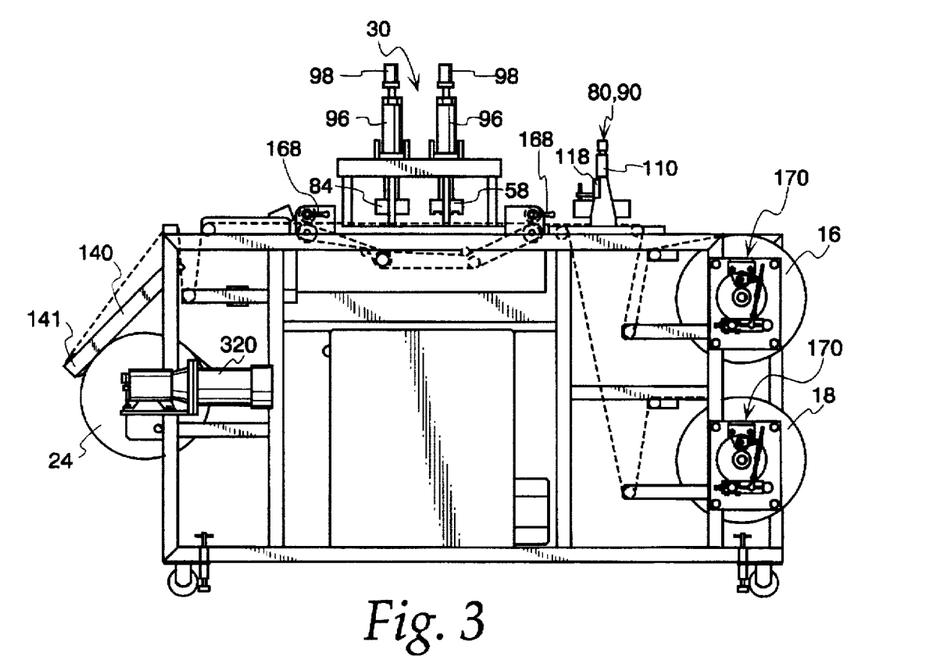
FIG. 3 is a rear elevational view thereof.
Figure 11:
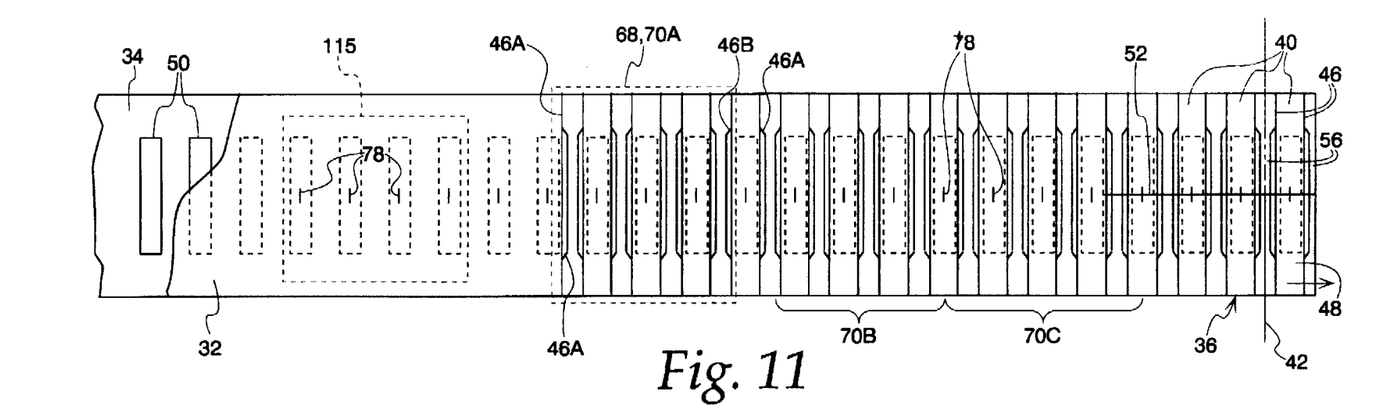
FIG. 11 is a top plan view of the valve film, taken on an enlarged scale.

Valve films 32, 34 are drawn in dash line in FIGS. 2 and 3 for clarity of illustration. As will be seen herein, the valve films 32, 34 are joined together at station 30 to form a product web 36, which is shown in greater detail in FIG. 11. Referring briefly to FIG. 11, product web 36 is comprised of two side-by-side serial arrays of self-sealing valves 40. In use, the valves are separated from one another by severing along line 42 (see the right hand end of FIG. 11) at a later time. If desired, the valves could be separated from one another by anvil cutters or the like at the outlet end 14 so as to be fed into a bulk storage bin or stacked in a magazine located in place of the rolls 24, 26. However, it is preferred that each serial array of valves be storm in continuous roll form. If desired, machine 10 could be readily altered to accommodate a single serial army of valves, or alternatively, three or more side-by-side arrays of valves, as may be desired.

Figures 15, 16:
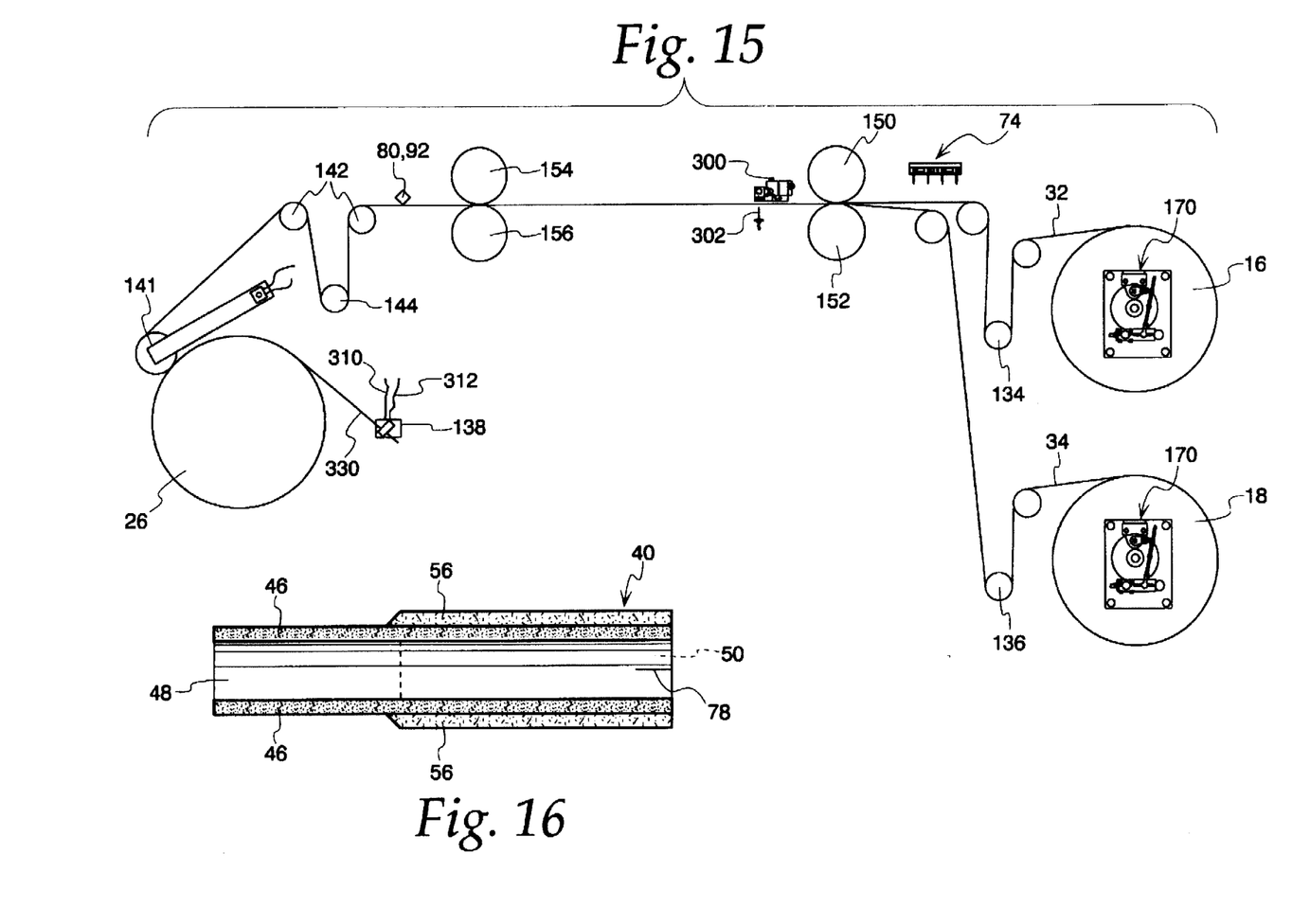
FIG. 15 is a schematic diagram indicating aspects of the film handling.
FIG. 16 is a top plan view of a balloon valve produced in accordance with the present invention.

Referring to FIGS. 11 and 16, the valves 40 are formed by sealing films 32, 34 together along sealing strips 46 so as to form a hollow channel 48 between the sealing strips of each valve. In the preferred embodiment, the upper valve film 32 is substantially clear, without printed markings, while the lower valve film 34 has a plurality of regularly spaced segments 50 of a heat resistant coating such as ink printed on the upper surface of valve film 34. As will be explained in greater detail herein, the product web 36 is slit along slit line 52 so that each valve subsequently formed will have a slit edge cutting through the heat resistant ink 50. As is commonly practiced in the balloon-making art, the slit ends of the self-sealing valve are typically located in the necks of toy balloons, the heat resistant ink preventing unintentional closure of the internal valve passageway when heat sealing dies are brought down on top of the valves, and their overlying balloon films. In the preferred embodiment illustrated in FIGS. 11 and 16, the numeral 56 indicates broadened portions of sealing lines 46. The sealing lines 46 and their broadened portions 56 are preferably formed by the same heat-sealing die 58, shown for example in FIG. 9.

Figure 9:
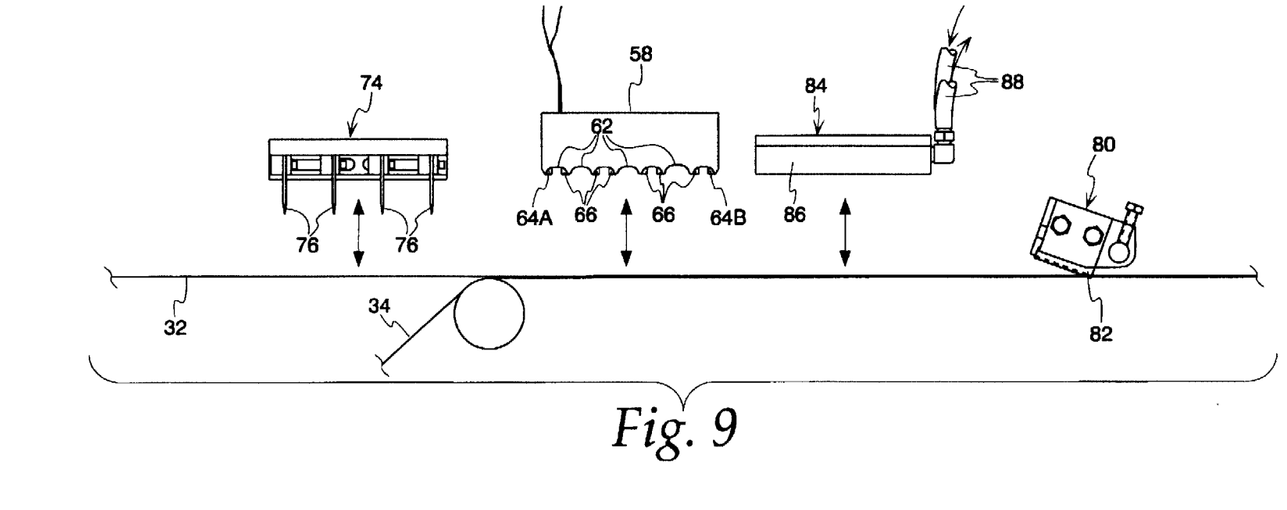
FIG. 9 is a schematic illustration thereof, taken from a side elevational view.

Referring to FIG. 9, heat-sealing die 58 has a bottom working surface 60 comprising a series of recesses 62 located between end portions 64 and the pairs of main portions 66 of the heating die. Preferably, the heating die is formed of heat conducting material of metallic composition and is machined to form recesses 62, leaving the working portions 64, 66 to contact the balloon film, in heat-sealing engagement therewith. The heat-sealing die 58 may be heated by electrical resistance, ultrasonic excitation, or steam, for example. In practice, a Teflon sheet may be interposed between the heat-sealing die 58 and the balloon films, in a manner known in the art. In the preferred embodiment, three pairs of main portion 66 are provided, each forming a complete valve, while the two end portions 64 form only one of the two sealing lines 46, 56 needed for a valve. The footprint of the heat-sealing die 58 is indicated by the dotted rectangle 68 shown in FIG. 11. Referring to FIGS. 9 and 11, the left-hand end portion 64a forms sealing lines 46a in the product web 36. Thus, in the preferred embodiment, the sealing lines 46a are located at the tail end of each heat-sealing cycle indicated by the reference numeral 70 in FIG. 11. As can be seen in FIG. 11, the right-hand end portion 64b of heat-sealing die 58 results in sealing line 46b, which completes the incomplete valve portion at the trailing end of footprint 70b.

As mentioned above, the heat-sealing die 58 forms a footprint 68 in the web, with each cycle of the heat-sealing die. The heat-sealing die is configured such that a complete valve product is formed with each cycle of operation. In the preferred embodiment, the valve product comprises a portion of valve films joined together so as to include six complete valve members and two partially complete valve members, all arranged in two laterally adjacent side-by-side arrays. The slitter separates the side-by-side serial arrays into separate serial arrays, as described above with reference to slit line 52. From the perspective of a manufacturer of valve products, the web may be regarded as comprising a serial succession of web portions, each portion corresponding to a footprint 70, with each footprint comprising a valve product. From the standpoint of a balloon manufacturer, formation of the valve product would be complete if the valves were formed in a single serial array. However, greater efficiencies are attainable in some instances where, as in the preferred embodiment, multiple serial arrays are formed with each cycle of the heat-sealing die. Balloon manufacturers sometimes prefer to sever individual valve members 40 from the product web at the point of fabrication of a toy balloon. As mentioned above, if a balloon manufacturer wishes to receive individual valve members, a convention cutting station can be employed to cut the product web along line 42 shown in FIG. 11. As will be appreciated, the valve making apparatus is flexible so as to be readily adapted for different valve products, as may be desired.

Referring again to FIG. 9, a punch mechanism generally indicated at 74 includes four punch blades 76 which form punched slits 78 in the upper valve film 32. As can be seen at the right-hand end of FIG. 11, the punched slits 78 are divided by slit line 52 such that the punched slits appear at the inlet edge of the resulting valves 40. The punch 74 will be described in greater detail herein with reference to FIGS. 12 and 13.

Also provided is a slitter mechanism 80 which includes a slitter blade 82 which divides web 36 along the slit line 52, as shown in FIG. 11. The cooling head 84 has a lower working surface 86 and inlet and outlet fluid lines 88. Serpentine channels are formed in the interior of cooling head 84 and coolant is circulated through the serpentine channels, thus cooling the working surface 86, transferring heat out of the cooling head by coolant flow in lines 88. As will be seen herein, the bottom working surface 86 of cooling head 84 is pressed against the recently heated footprints caused by pressing heat-sealing die 58 against the valve films.

Despite the advantages of the heat-sealing die 58 (which incorporates both complete and partial valve formations in a single cycle of operation), it has been found that the heat-sealing die imparts a substantial heat loading to a localized area of the valve films, with each cycle of operation. Further, the valve films are chosen for optimum self-sealing characteristics, or compatibility of bonding to conventional balloon films and for other design considerations unrelated to their ability to conduct heat away from a hot spot. It has been observed that the valve films sustain elevated temperatures after the heat-sealing die has been cycled which allows the valve films to pucker in these areas of local softening. Further, difficulties have been encountered when the valve films are slit immediately after heating. Accordingly, it has been advantageous to provide a cooling head 84 immediately downstream of the heat sealing die. The cooling head 84 presses the softened, heated areas maintaining and/or restoring their flatness, while heat is transferred to the fluid circuit in the cooling head. The cooling head, by cooling and flattening, conditions the valve films for subsequent slitting.

As will be seen by comparing FIGS. 9 and 11, the footprint of the cooling head 84 does not match the footprints of the heat-sealing die 58. If desired, configuration of the cooling head can be changed and can be moved immediately adjacent the heat-sealing die, if desired.

Figure 4:
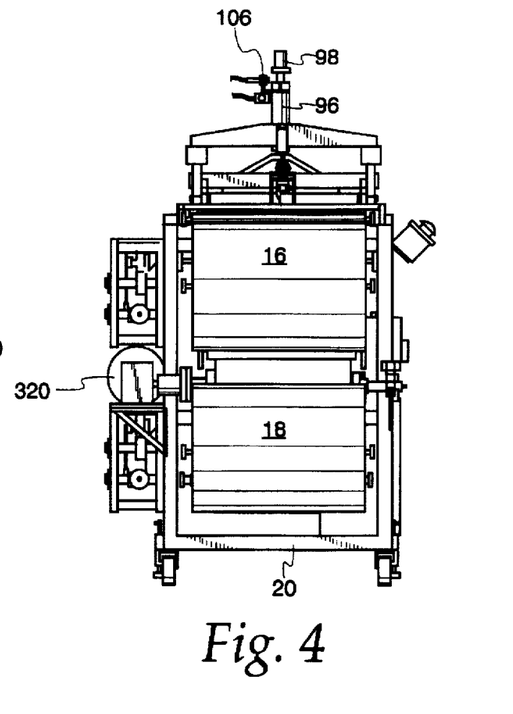
FIG. 4 is an end elevational view showing the inlet end thereof.
Figure 5:
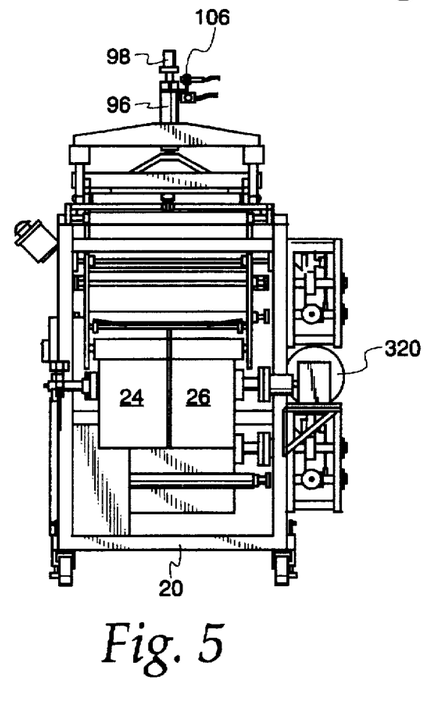
FIG. 5 is an end elevational view showing the outlet end thereof.
Figure 6:
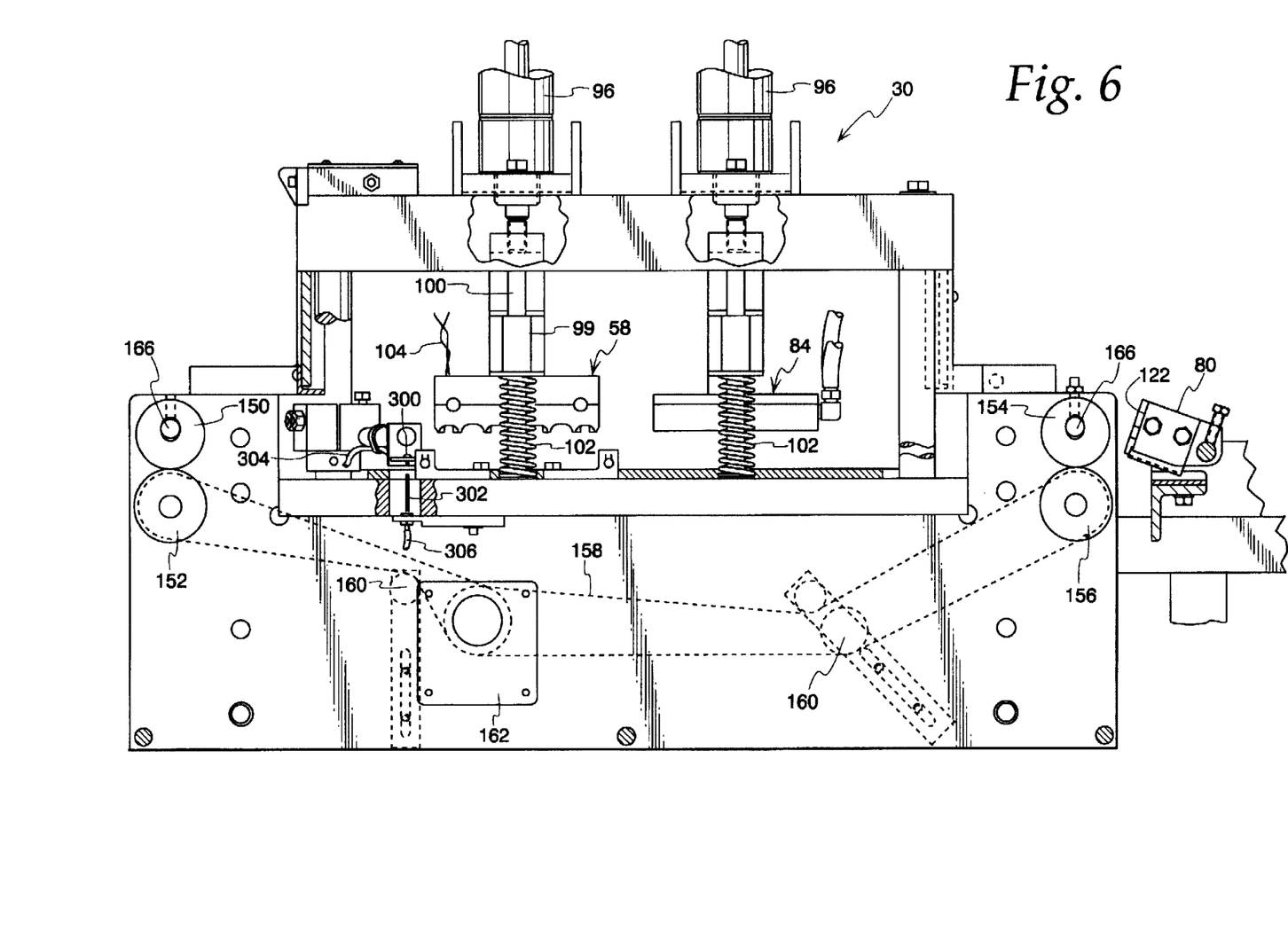
FIG. 6 is a fragmentary view showing a portion of FIG. 2 on an enlarged scale.
Figure 7:
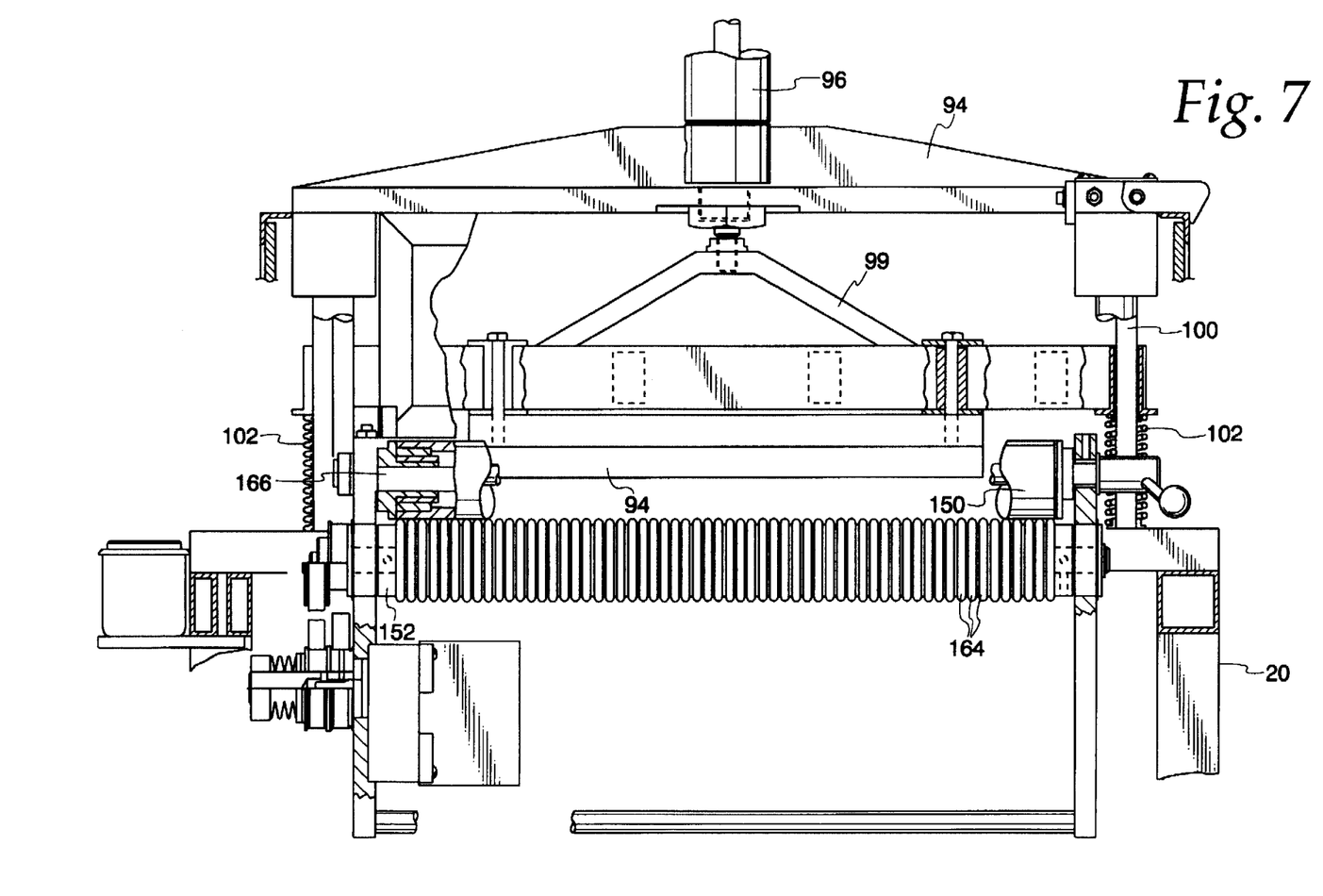
FIG. 7 is an end elevational view of the fragment illustrated in FIG. 6.
Figure 8:
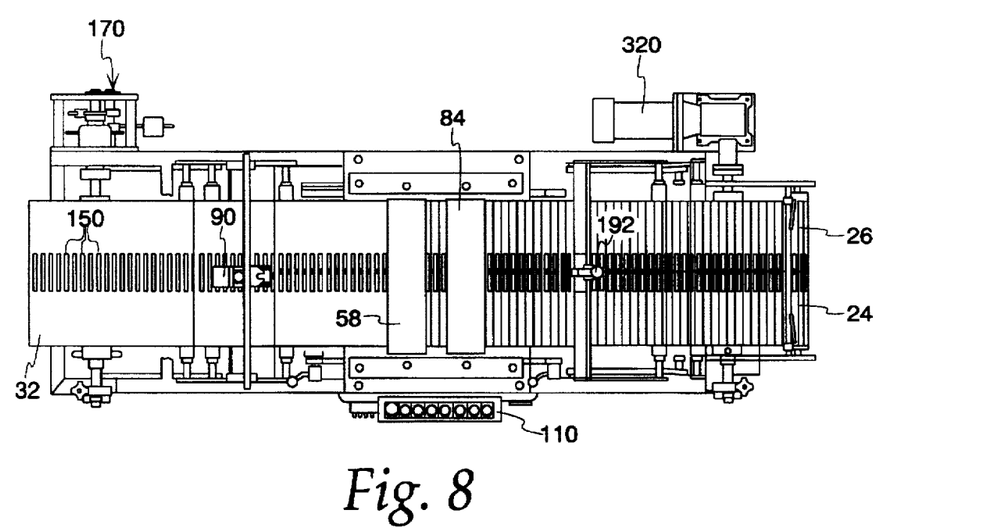
FIG. 8 is a top plan view of the apparatus, showing components of the apparatus acting directly on the valve film.

Referring to FIGS. 1–6, the workstation 30 includes the heat-sealing die 58 and cooling head 84 (shown in greater detail in FIG. 6). The punch 74 is located upstream of workstation 30, at a punch station 90. Slitter 80 is located downstream of workstation 30, at a slitter station 92.

Referring now to FIGS. 1–7, workstation 30 includes cross members 94 upon which actuators 96 are mounted. Actuators 96 preferably comprise double-ended air cylinders, with stops 98 provided at their upper end. Carriers 99 are attached to the bottom end of the actuators 96. As shown for example in FIG. 6, the carriers 99 are slidingly mounted on slide shafts 100, and work against coil springs 102. The coil springs provide a safety member, preventing the heat-sealing die 58 from falling down onto valve film if the operating signal to the actuator should be discontinued (e.g., loss of power to the facility). The electrical wires 104 energizing the heat-sealing die 58 could be opened by a switch in this eventuality, but the heat-sealing die 58 would nonetheless remain heated for some time.

In the preferred embodiment, the actuator and support systems for the heat-sealing die 58 and for the cooling head 84 are substantially identical and thus a coil spring is provided to keep the cooling head 84 above the valve film in a loss-of-power situation, although this is largely unnecessary. The identical mounting and actuation of the heating and cooling heads provides greater flexibility for machine 10, should reconfiguration be desired at some later time. Referring to FIGS. 4 and 5, position sensors, preferably of the optical type, are located atop actuators 96 to sense the position of the actuators, and hence of the heating and cooling heads attached thereto. These signals, as with other electrical connections, are routed to control cabinets 108, 110 shown in FIG. 2. Sealing control signals and cooling control signals are routed through the electrical connections to the respective actuators 96 for controlling the heat-sealing die 58 and cooling head 84, respectively. In the preferred embodiment, the cooling head and heat-sealing die are operated simultaneously, and accordingly, the same start signal, in effect, is sent to both actuators 96. However, it has been found advantageous to increase the dwell time of the cooling head, which allows the cooling head and its associated coolant circuit to have an inexpensive, conventional construction. In the preferred embodiment, ethylene glycol is circulated through the cooling head and an external radiator (not shown). Cryogenic and other more effective systems would reduce the cooling head dwell time, but would be difficult and costly to implement.

Figure 12:
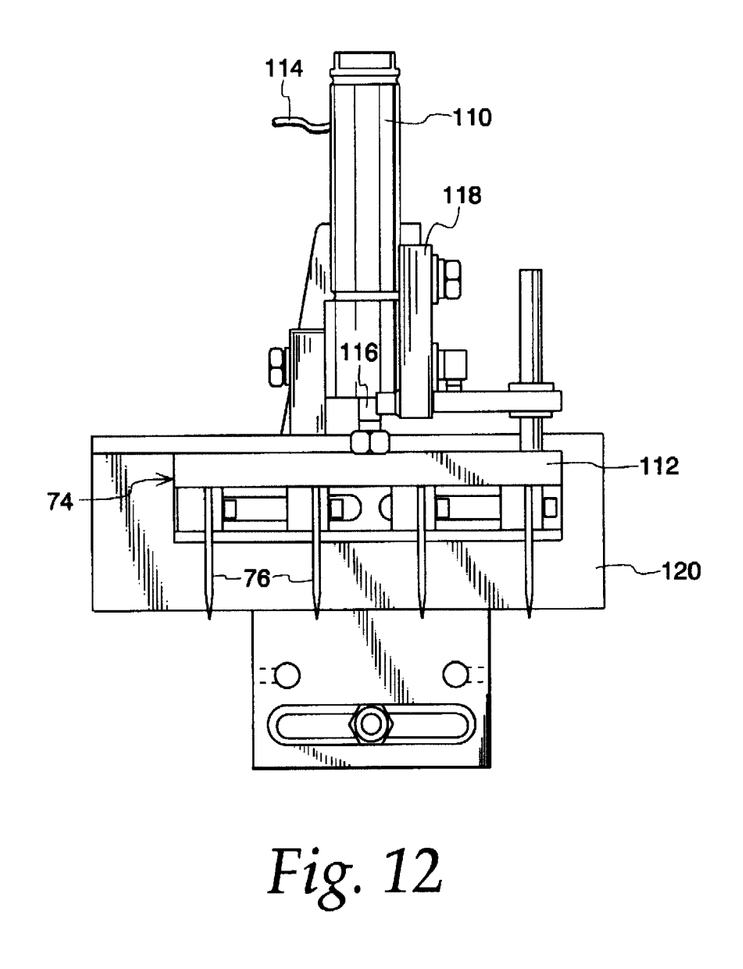
FIG. 12 is a side elevational view of the punch member shown in FIG. 9.
Figure 13:
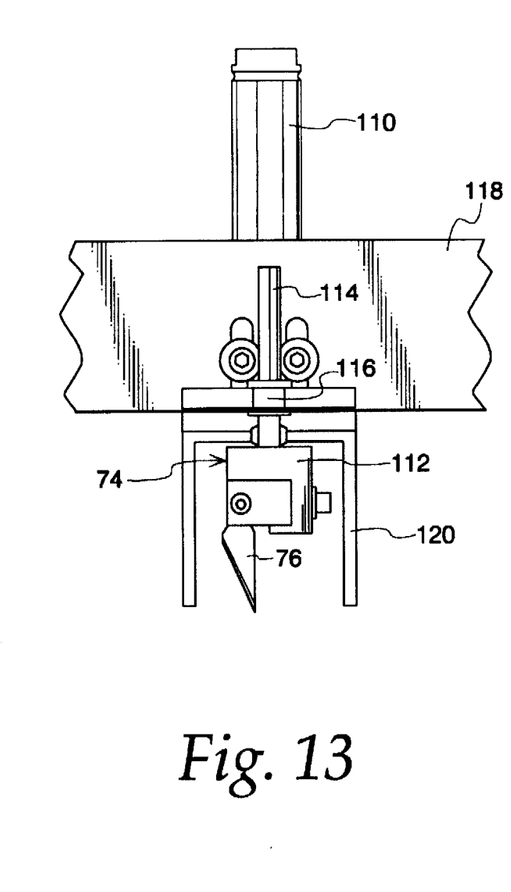
FIG. 13 is an end elevational view thereof.

Referring again to FIGS. 1–5 and 12–13, punch 74 is driven by an actuator 110. Four blades 76 are mounted in a common head 112, with the head having a guide rod 114 sliding in a support ring 116 (as shown in FIG. 12). Control signals are sent to actuator 110 via inlet conduit 114. When actuator 110 receives a punch signal from control circuitry in control cabinet 110, output shaft 116, to which head 112 is attached, is lowered, with knife blades 76 piercing the valve film, as shown by the dotted rectangle 115 in FIG. 11. In the preferred embodiment, a shroud 120 guards the blade 76 against inadvertent contact, when the blades are in the raised position.

Referring to FIGS. 1–6 and 15, the slitter mechanism 80 is mounted on a cross arm 122 suspended from the sides of frame 20. Slitter mechanism 80 includes a slitter blade 82 which is plunged into the valve films at the initial setup of the machine, and which remains in place, to slit the resulting product web formed by successive cycles of the heat-sealing die. Referring to FIGS. 1–6, the supply rolls 16, 18 are mounted for rotation on support shafts 126, 128, respectively. Guide rollers 130, 132 and dancer arms 134, 136 are provided for the valve films 32, 34, respectively. The takeup rolls 24, 26 are preferably mounted on a common shaft 134 which is driven by a drive motor 320 (see FIG. 1) under control of a speed potentiometer 138. The speed potentiometer 138 is actuated by a follower arm 330 having a free end 332 and an opposed end pivotally mounted to frame 20. The product web 36 travels over guide roller 142 and dancer roller 144 before passing over the free end 141 of a rewind arm 140.

Turning now to FIG. 6, workstation 30 includes inlet nip rollers 150, 152 and outlet nip rollers 154, 156 at the inlet and outlet ends of the workstation. The bottom nip rollers 152, 156 are driven by a timing belt 158 having a tension adjustment mechanism 160. Timing belt 158 is driven by a motor 162 located in compartment 110 (see FIG. 2). As seen for example in FIG. 7, the lower nip roller 152 contains a series of O-rings 164 (the same is true for nip roller 156). This provides enhanced frictional engagement of the film passing through the workstation. The upper nip roller 150 is preferably eccentrically mounted on shaft 156. As handle 168 is rotated, upper nip roller 150 is moved toward and slightly away from lower nip roller 152, thus providing a convenient pressure adjustment. When the desired pressure is obtained, via set screws, handle 168 is automatically locked in position using conventional cam lock stopping means. The same arrangement is provided for the downstream nip roller 154. The upper nip rollers preferably function as idler rollers being driven by the lower nip rollers 153, 156. The upper nip rollers, as mentioned, are mounted on an eccentric roller bearing system and by turning the handle 168 in different directions, tension on the film passing through workstation 30 is either applied or removed, as desired. In the preferred embodiment, the nip rollers 152, 156 are driven through a slip clutch, and the timing belt and its associated drive are configured in a conventional manner such that the downstream nip roller 156 can be driven at a faster speed than the nip roller 152, if desired. Preferably, the amount of overspeed in the nip roller 156 is small, only enough to ensure the proper tension of film passing through workstation 30, but without causing stretching of the heat-softened film.

Figure 10:
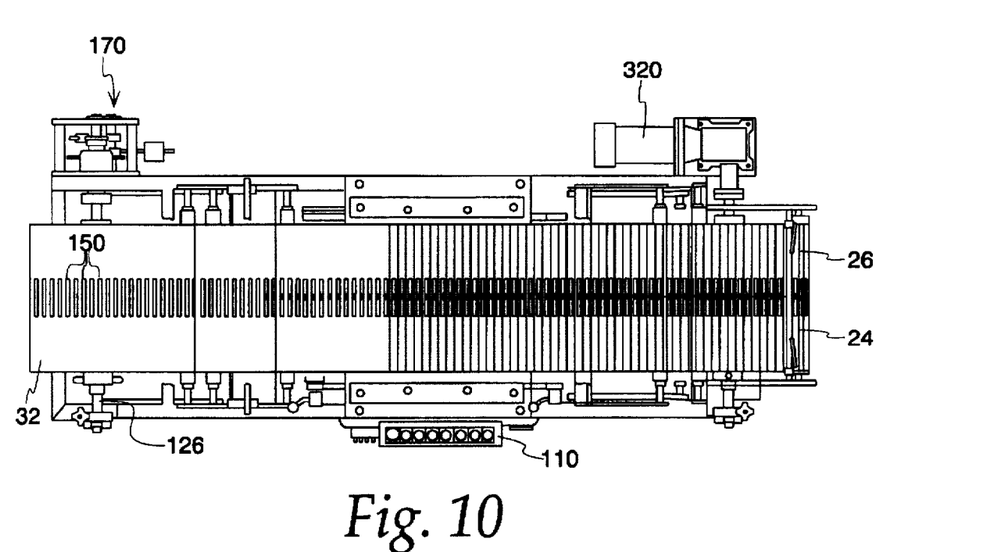
FIG. 10 is a view similar to that of FIG. 8, but with the top portion removed, exposing the valve film.
Figure 14:
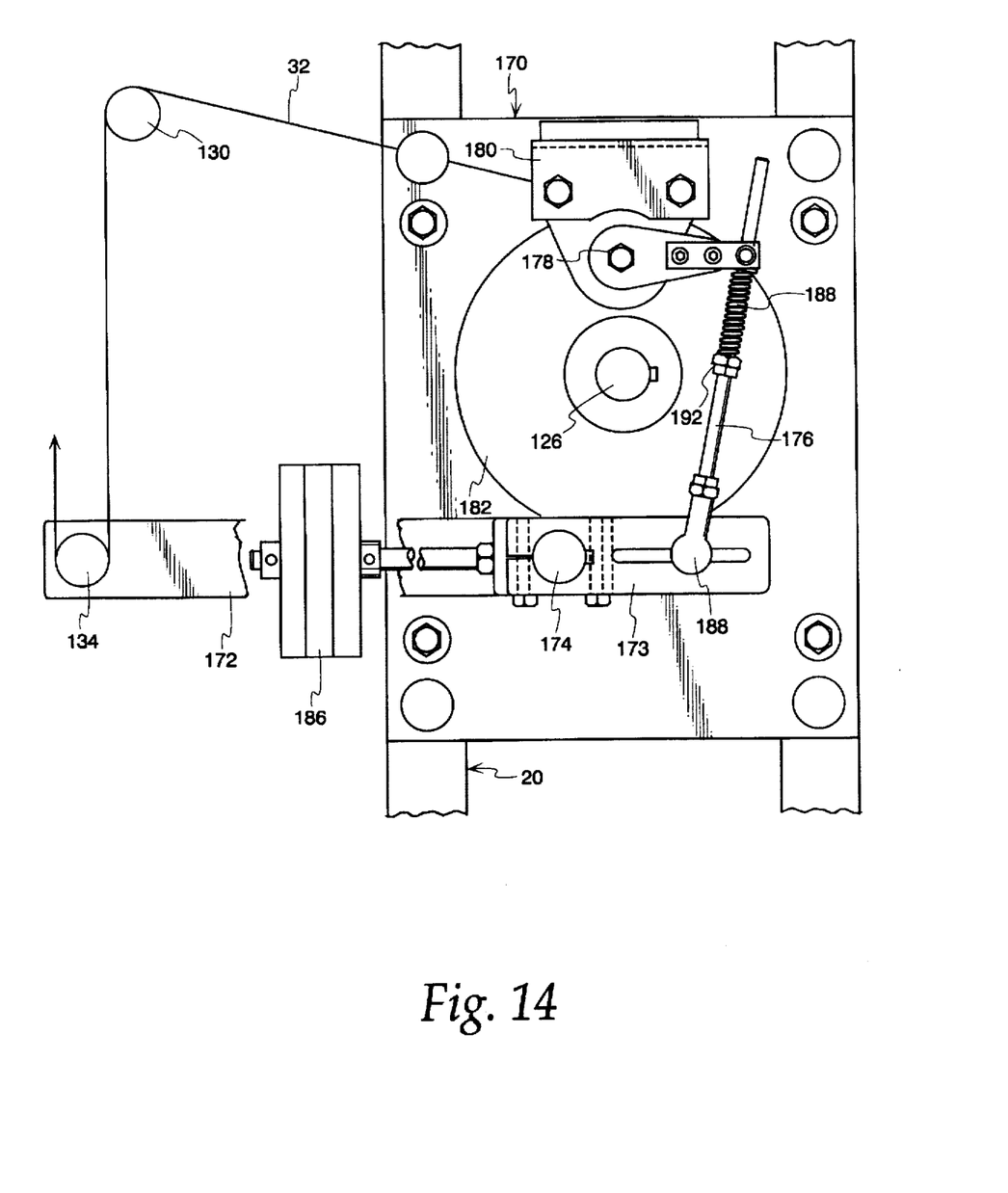
FIG. 14 shows a fragment taken from the right hand portion of FIG. 3, shown on an enlarged scale.

With reference to FIG. 15, tension on the valve film in workstation 30 is controlled as described above, with operation of nip rollers at the upstream and downstream ends of the workstation. Speed on the output web is controlled by motor 320 (see FIG. 1) which receives speed control signals from speed potentiometer 138. Tension is controlled by rewind dancer arm, and also by rewind dancer weights 340 (see FIG. 1). Tension of the rolls 24, 26 are achieved by the rewind arm 140 and the amount of rewind dancer weights used. In effect, the nip rollers at workstation 30 provide pulling power to the balloon films, which causes the films to be unwound from their supply rolls 16, 18. As will now be described, the shafts 126, 128 on which the supply rolls are mounted are controlled by respective braking systems generally indicated at 170. With reference to FIGS. 3, 10 and 14, operation of one break system 170, for the upper supply roll 16, will now be described. It should be borne in mind, however, that the braking system for the lower supply roll 18 is preferably identical. As mentioned above, valve film 32 travels over guide roller 130 and dancer roller 134. Dancer roller 134 is mounted on arm 172 which in turn is pivotally mounted on shaft 174. As tension in valve film 32 is increased, the dancer roller 134 is raised, thus rotating arm 172 in a clockwise direction. An adjusting rod 176 is coupled to the remote free end of arm 172 and is coupled to a disk brake lever or actuator 178, which extends from a floating caliper 180 of a conventional caliper disk brake. Brake pads operated by the floating caliper impart a braking pressure to disk 182 which in turn is mounted to shaft 126. As tension in film 32 is increased, and arm 172 is lowered in a clockwise position, this brake lever 178 is also operated in a clockwise direction to release braking pressure applied to disk 182 by floating caliper 180. As tension in film 32 is decreased, an opposite sequence of actions occurs, resulting in increased pressure being applied to disk 182. As can be seen in FIG. 14, several braking adjustments are provided. For example, an adjustable weight 186 is provided for arm 172 to adjust the dancer arm tension. A coil spring 188 is provided to soften operation of the caliper disk brake, removing or softening impulsive input commands. As can be seen in FIG. 14, rod 176 is slidably coupled to arm 173 at coupling member 188. As a coupling member is moved toward shaft 174, a slower and softer response of the caliper disk brake is experienced. An opposite result is obtained when coupler member 188 is moved away from shaft 174. As shown in FIG. 14, spring 188 is adjusted by jam nuts 192 so as to be positioned at different points along guide rod 176. If the jam nuts 192 are raised, for example, the caliper disk brake requires a higher dancer arm position to initiate operation.

The use of a heat-sealing die as described above, which forms a partial valve in addition to one or more complete valves, provides a number of advantages. For example, to form a complete valve, the die must be recessed, as described above, to bridge the spaced-apart lateral sealed edges of the valve. This bridging material can be omitted for end portions of the die where only a portion of a valve, i.e., a single lateral edge of the valve is formed. Other advantages obtain from the compact die configuration. In addition to lowered kinetic requirements for the die punching operation, vibrations in the die throughout its operating cycle, are also reduced. Because of the symmetric nature of the lateral edges of a valve, the partial valve seals, or end portions as described above, are mere images of one another and balancing of the heat-sealing die so as to reduce vibrations is relatively straightforward. In addition, the compact heat-sealing die radiates less heat to the web, while heat transfer in the compact die body is improved.

Referring again to FIGS. 6 and 11, sensors 300, 302 monitor the web passing through workstation 30, and in particular, track the edges the edges of heat resist ink portions 50. The preferred sensors operate in an opposed mode of detection, with light passing through the emitter 302 to the receiver 300. Electrical conductors 304, 306 couple the emitter and receiver elements to control cabinet 110. Preferably, the trailing edge of the heat resist ink portions 50 triggers a control pulse which in turn controls the actuators 96 for the heat-sealing die 58 and cooling head 84. As can be seen in FIG. 6, it is generally preferred that the sensors 300, 302 be located immediately adjacent the heat-sealing die. Because of the configuration of the heat-sealing die (i.e., its part-valve configuration) the sensors 300, 302 can be positioned over the portion of the web comprising the incomplete valve portion being formed by the heat-sealing die. Accordingly, close tolerances and increased accuracies can be obtained without requiring costly instrumentation. Because the sensors 300, 302 are operated in an opposed mode of detection (with light passing from one sensor being received in the other sensor) small registration changes may be accomplished by moving only one of the sensors. Larger registration changes are accommodated by moving both sensors 300, 302.

Turning again to FIG. 15, the overall web handling system will now be briefly reviewed. As mentioned, the web is comprised of upper and lower valve films 32, 34 drawn from supply rolls 16, 18. Two pairs of nip rollers are operated in synchronism by the timed driving arrangement described above with reference to FIG. 6. Preferably, the lower rollers 152, 156 are powered so as to pull films 32, 34 from their supply rolls. A slip clutch is employed in the lower drive rolls so that the lower feed roll 156 turns slightly faster than the inlet feed roll 152 so as to assure a preselected tension in the web extending between the pairs of rollers. The films 32, 34 pass over respective dancer rollers 134, 136. These dancer rollers in turn are deflected by changes in film position, the deflection being transmitted to floating caliper disk brakes 170 to adjust the film and brake tension.

Referring additionally to FIGS. 1, 9, 12 and 13, the upper film 32 is punched by punch block 74 to form crosswise slits 78 in the upper valve film. Since the slits 78 must be aligned with respect to the completed valves 40 (see, for example, FIG. 16), the actuator 110 for the punch is preferably driven by control signals generated from the aforementioned sensors 300, 302. As described above, the sealing and cooling heads are located immediately downstream of sensors 300, 302. In the preferred embodiment, laterally adjacent valves are formed with each operation of the heat-sealing die. With successive operations of the heat-sealing die, the nip rollers advance the web past workstation 30, so as to bring previously sealed portions of the web toward the outlet end of the machine, so as to position unsealed portions of the films 32, 34 underneath the heat-sealing die. At this time, recently sealed (i.e., heated) portions of the web are positioned underneath the cooling head. With successive operations of the heading and cooling head and attendant advancement of the web, the product web (i.e., portions of the web in which valve elements are formed) passes underneath the slitter mechanism 80 which divides the product web into two independent webs which are independently wound on respective rolls 24, 26. The slit webs pass underneath roller 141 to their respective takeup rolls. As the takeup rolls increase in size, the arm 143 is raised, and the changing position is sensed by potentiometer 138, with output signals from the potentiometer being coupled by conductors 310, 312 to drive motor 320, changing the speed at which the motor drives the takeup reels 24, 26. ON-OFF signals to the motor 320 are obtained by sensors which monitor the position of dancer roll 144.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Apparatus for making a web containing multiple toy balloon valves, comprising:

a supply of a web including overlying first and second valve films, with the web comprising first and second web portions in serial succession;

a workstation whereat valve products are made from the web;

conveyor means actuable by a conveyor control signal for indexing successive portions of the web in steps to the workstation;

sealing means at the workstation, actuable by a sealing control signal, including a heating surface mounted for movement into and out of engagement with the web, for heating the web to seal the first and the second valve films together to form a valve product including at least one toy balloon valve;

cooling means at the workstation, actuable by a cooling control signal for cooling the web, including a heat exchange surface movable into and out of engagement with the valve product;

actuator means for moving the heating surface and the heat exchange surface into and out of engagement with the web; and control means for sending a conveyor control signal to the conveyor means for indexing the first portion of the web containing a first valve product past the sealing means and for indexing the second portion of the web adjacent to the sealing means, for sending a sealing control signal to the actuator means to move the heating surface into engagement with the first and the second valve films of the second portion of the web together to form another valve product in serial succession with the first valve product and for sending a cooling control signal to the actuator means to move the heat exchange surface into engagement with the web for cooling the web and for subsequently moving the heating surface and the heat exchange surface out of engagement with the web in preparation for a subsequent indexing step.

2. The apparatus of claim 1 further comprising product takeup means for receiving the serial succession of valve products.

3. The apparatus of claim 2 wherein the valve products comprise a serial succession of toy balloon valves rolled onto the product takeup means.

4. The apparatus of claim 3 further comprising valve punching means for punching a predetermined part of the first valve film so that the predetermined part is subsequently located at one end of each toy balloon valve.

5. The apparatus of claim 1 wherein the sealing means and the cooling means are independently moved by the actuator means.

6. The apparatus of claim 1 wherein the sealing means and the cooling means engage the web for independently adjustable times between successive indexing steps.

7. The apparatus of claim 1 wherein the valve products formed by a single operation of the sealing means comprises a serial succession of toy balloon valves.

8. The apparatus of claim 1 wherein one of the first and the second valve films is printed with a serial succession of spaced-apart heat resistant coating segments which are subsequently located at one end of the toy balloon valves, and the control means includes sensor means for detecting the coating segments and for sending the conveyor control signal in response thereto.

9. Apparatus for making a web containing multiple toy balloon valves, comprising:

a supply of a web including overlying first and second valve films with the web comprising first and second web portions in serial succession;

a workstation whereat valve products are made from the web;

conveyor means actuable by a conveyor control signal for indexing successive portions of the web in steps to the workstation;

sealing die means at the workstation, actuable by a sealing control signal, including a heating surface mounted for movement into and out of engagement with the web, for heating the first portion of the web to seal the first and the second valve films together to form a serial succession of valve products which include at least two laterally adjacent valves;

actuator means for moving the heating surface and the heat exchange surface into and out of engagement with the web;

control means for sending a conveyor control signal to the conveyor means for indexing the first portion of the web containing a first valve product past the sealing means and for indexing the second portion of the web to the actuator means, for sending a sealing control signal to the sealing means to move the heating surface into engagement with the first and the second valve films of the second portion of the web together to form a second pair of laterally adjacent valves in serial succession with the first pair of laterally adjacent valves and for subsequently moving the heating surface out of engagement with the web in preparation for a subsequent indexing step; and slitting means downstream of the workstation for slitting the web to form two separate serial successions of toy balloon valves.

10. The apparatus of claim 9 further comprising cooling means at the workstation, actuable by a cooling control signal for cooling the web, including a heat exchange surface movable into and out of engagement with the valve product, and said control means sending a cooling control signal to the cooling means for cooling the web.

11. The apparatus of claim 10 further comprising product takeup means for receiving the serial succession of valve products.

12. The apparatus of claim 11 wherein the valve products comprise a serial succession of toy balloon valves rolled onto the product takeup means.

13. The apparatus of claim 10 further comprising valve punching means for punching a predetermined part of the first valve film so that the predetermined part is subsequently located at one end of the toy balloon valve.

14. The apparatus of claim 10 wherein the valve products formed by a single operation of the sealing means comprises a serial succession of toy balloon valves.

15. The apparatus of claim 10 wherein the valves formed at the workstation have opposed ends, one of the first and the second valve films is printed with a serial succession of spaced-apart heat resistant coating segments which are subsequently located at opposed ends of the toy balloon valves, and the control means includes sensor means for detecting the segments and for sending the conveyor control signal in response thereto.

16. The apparatus of claim 15 further comprising valve punching means for punching a predetermined part of the first valve film so that both valves of a pair of laterally adjacent valves formed by the sealing die have punched portions.

17. The apparatus of claim 10 wherein the sealing means and the cooling means act independently of one another.

18. Apparatus for making a web containing multiple toy balloon valves, comprising:
   a supply of a web including overlying first and second valve films, with the web comprising first and second web portions in serial succession;
   a workstation whereat valve products are made from the web;
   conveyor means actuable by a conveyor control signal for indexing successive portions of the web in steps past the workstation;
   sealing means at the workstation, actuable by a sealing control signal, including a heating surface mounted for movement into and out of engagement with the web, for heating the web to seal the first and the second valve films together to form a valve product comprising at least one entire balloon valve in serial succession with an incomplete portion of at least one other balloon valve;
   actuator means for moving the heating surface and the heat exchange surface into and out of engagement with the web; and
   control means for sending a conveyor control signal to the conveyor means for indexing the first portion of the web containing a first valve product past the sealing means and for indexing the second portion of the web to the sealing means, for sending a sealing control signal to the actuator means to move the heating surface into engagement with the first and the second valve films of the second portion of the web together to form a second valve product, which cooperates with the incomplete part of the first portion to form a complete valve and for subsequently moving the heating surface out of engagement with the web in preparation for a subsequent indexing step.

19. The apparatus of claim 18 further comprising cooling means at the workstation, actuable by a cooling control signal for cooling the web, including a heat exchange surface movable into and out of engagement with the valve product, and said control means sending a cooling control signal to the cooling means for cooling the web.

20. The apparatus of claim 18 further comprising product takeup means for receiving the serial succession of valve products.

21. The apparatus of claim 20 wherein the valve products comprise a serial succession of toy balloon valves rolled onto the product takeup means.

22. The apparatus of claim 18 further comprising valve punching means for punching a predetermined part of the first valve film so that the predetermined part is subsequently located at one end of the toy balloon valve.

23. The apparatus of claim 18 wherein the sealing means and the cooling means act independently of one another.

24. Apparatus for making a web containing multiple toy balloon valves, comprising:
   a supply of a web including overlying first and second valve films and comprising first and second web portions in serial succession;
   a workstation whereat valve products are made from the web;
   conveyor means actuable by a conveyor control signal for indexing successive portions of the web in steps past the workstation;
   a sealing die at the workstation, actuable by a sealing control signal, including a heating surface mounted for movement into and out of engagement with the web, for heating the first portion of the web containing a first valve product to seal the first and the second valve films together to form a first pair of laterally adjacent toy balloon valves;
   means for mounting the sealing die for movement into and out of engagement with the web;
   an actuator means for moving the sealing die into and out of engagement with the web; and
   control means for sending a conveyor control signal to the conveyor means for indexing the first portion of the web past the workstation and for indexing the second portion of the web to the sealing means, for sending a sealing control signal to the sealing means to move the heating surface into engagement with the first and the second valve films of the second portion of the web together to form a second pair of laterally adjacent valves in serial succession with the first pair of laterally adjacent valves and for subsequently moving the heating surface out of engagement with the web in preparation for a subsequent indexing step.

25. The apparatus of claim 24 further comprising slitting means downstream of the workstation for slitting the web to form two separate serial successions of toy balloon valves.

26. The apparatus of claim 24 further comprising cooling means at the workstation, actuable by a cooling control signal for cooling the web, including a heat exchange surface movable into and out of engagement with the valve product, and said control means sending a cooling control signal to the cooling means for cooling the web.

27. The apparatus of claim 26 further comprising product takeup means for receiving the serial succession of valve products.

28. The apparatus of claim 27 wherein the valve products comprise a serial succession of toy balloon valves rolled onto the product takeup means.

29. The apparatus of claim 24 wherein the valve products formed by a single operation of the sealing means comprises a serial succession of toy balloon valves.

30. The apparatus of claim 24 wherein the valves formed at the workstation have opposed ends, one of the first and the second valve films is printed with a serial succession of spaced-apart heat resistant coating segments which are subsequently located at opposed ends of the toy balloon valves, and the control means includes sensor means for detecting the segments and for sending the conveyor control signal in response thereto.

31. The apparatus of claim 24 further comprising valve punching means for punching a predetermined part of the first valve film so that both valves of a pair of laterally adjacent valves formed by the sealing die have resulting punched portions.

32. The apparatus of claim 24 wherein the sealing means and the cooling means act independently of one another.

33. Apparatus for making a web containing multiple toy balloon valves, comprising:

a supply of a web including overlying first and second valve films, including a roll of the first valve film and a roll of the second valve film;

tension control means for independently controlling the tension of the first and the second valve films;

a workstation whereat valve products are made from the web;

conveyor means actuable by a conveyor control signal for indexing successive portions of the web in steps past the workstation;

sealing means at the workstation, actuable by a sealing control signal, including a heating surface mounted for movement into and out of engagement with the web, for heating the web to seal the first and the second valve films together to form valve products comprising at least one toy balloon valve;

cooling means at the workstation, actuable by a cooling control signal for cooling the web, including a heat exchange surface movable into and out of engagement with the valve product;

said conveyor means comprising an upstream pair of nip rollers upstream of the sealing means and an downstream pair of nip rollers downstream of the cooling means and drive means for driving the upstream and the downstream pairs of nip rollers;

actuator means for moving the heating surface and the heat exchange surface into and out of engagement with the web; and control means for sending a conveyor control signal to the conveyor means for indexing a first portion of the web containing a first valve product past the sealing means and for indexing a second portion of the web to the sealing means, for sending a sealing control signal to the sealing means to move the heating surface into engagement with the first and the second valve films of the second portion of the web together to form another valve product and for sending a cooling control signal to the actuator means to move the heat exchange surface into engagement with the web for cooling the web and for subsequently moving the heating surface and the heat exchange surface out of engagement with the web in preparation for a subsequent indexing step; and product takeup means for rolling the valve product onto a spool, takeup drive means for rotatably driving the spool, takeup sensor means for sensing the amount of valve product on the spool and for developing an output signal in response thereto and takeup control means responsive to the takeup sensor means output signal for controlling the takeup drive means.

34. The apparatus of claim 33 wherein the takeup sensor means comprises a sensor arm having a free end and pivotally mounted adjacent the spool so as to contact valve product rolled onto the spool and for pivoting as the amount of valve product changes, and pivot sensing means for sensing pivoting of the sensor arm and for developing the output signal in response thereto.

* * * * *